US008924738B2

(12) United States Patent
Nimura et al.

(10) Patent No.: US 8,924,738 B2
(45) Date of Patent: Dec. 30, 2014

(54) INFORMATION PROCESSING DEVICE, CONTENT PROCESSING SYSTEM, AND COMPUTER READABLE MEDIUM HAVING CONTENT PROCESSING PROGRAM

(75) Inventors: Kazuaki Nimura, Kawasaki (JP); Yousuke Nakamura, Kawasaki (JP); Fumio Honda, Kawasaki (JP); Isamu Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 490 days.

(21) Appl. No.: 12/720,286

(22) Filed: Mar. 9, 2010

(65) Prior Publication Data
US 2010/0232607 A1 Sep. 16, 2010

(30) Foreign Application Priority Data

Mar. 11, 2009 (JP) ................................. 2009-058439

(51) Int. Cl.
H04L 29/06 (2006.01)
H04N 21/6334 (2011.01)
G06F 21/62 (2013.01)
H04N 5/913 (2006.01)
H04N 7/16 (2011.01)
H04N 21/4335 (2011.01)
H04N 21/4623 (2011.01)
H04N 21/488 (2011.01)

(52) U.S. Cl.
CPC .......... *H04N 21/63345* (2013.01); *G06F 21/62* (2013.01); *H04N 5/913* (2013.01); *H04N 7/163* (2013.01); *H04N 21/4335* (2013.01); *H04N 21/4623* (2013.01); *H04N 21/4882* (2013.01); *G06F 2221/2143* (2013.01); *H04N 2005/91364* (2013.01)
USPC ............. 713/189; 713/153; 713/168; 380/30; 380/228; 380/277; 380/278; 380/283

(58) Field of Classification Search
CPC . G06F 21/62; G06F 2221/2143; H04N 5/913; H04N 7/163; H04N 21/4623; H04N 21/4882; H04N 21/63345; H04N 21/4335; H04N 2005/91364

USPC ..................... 380/30, 228, 283, 28, 277–279; 713/160, 180–194, 153, 168
See application file for complete search history.

(56) References Cited

U.S. PATENT DOCUMENTS 6,226,385 B1 * 5/2001 Taguchi et al. ............... 380/283
6,480,096 B1 11/2002 Gutman et al.
(Continued)

FOREIGN PATENT DOCUMENTS

JP 2000-183867 6/2000
JP 2004-355268 12/2004
(Continued)

OTHER PUBLICATIONS

German Office Action issued Oct. 6, 2010 in corresponding German Patent Application 102010010808.1-53.

(Continued)

Primary Examiner — Kambiz Zand
Assistant Examiner — Don Zhao
(74) Attorney, Agent, or Firm — Staas & Halsey LLP

(57) ABSTRACT

An information processing device and method include storing encrypted content, storing a key for decrypting the encrypted content stored, decrypting the encrypted content stored using the key, storing a deletion table storing information indicating whether or not the key stored is to be deleted when a transition from an operating state to one of other states is made, the information corresponding to the other states, and checking the information in the deletion table corresponding to the one of the other states and deleting the key when the information indicates that the key is to be deleted.

12 Claims, 10 Drawing Sheets

(56) References Cited

U.S. PATENT DOCUMENTS

| | | | |
|---|---|---|---|
| 6,643,781 B1* | 11/2003 | Merriam | 726/35 |
| 2003/0004888 A1* | 1/2003 | Kambayashi et al. | 705/59 |
| 2003/0200453 A1* | 10/2003 | Foster et al. | 713/200 |
| 2004/0078066 A1* | 4/2004 | Ohta et al. | 607/60 |
| 2005/0071279 A1* | 3/2005 | Asano | 705/57 |
| 2005/0138377 A1* | 6/2005 | First et al. | 713/169 |
| 2005/0226420 A1* | 10/2005 | Makela et al. | 380/270 |
| 2007/0077925 A1 | 4/2007 | Hiyama | |
| 2007/0100759 A1 | 5/2007 | Kasahara et al. | |
| 2008/0031453 A1* | 2/2008 | Pedersen | 380/270 |
| 2008/0175392 A1* | 7/2008 | Ogura et al. | 380/278 |
| 2009/0006864 A1* | 1/2009 | Hashimoto et al. | 713/190 |
| 2009/0019279 A1* | 1/2009 | Kato | 713/150 |
| 2009/0063847 A1* | 3/2009 | Haynes et al. | 713/150 |
| 2009/0268912 A1* | 10/2009 | Nakae | 380/270 |
| 2009/0328238 A1* | 12/2009 | Ridewood Glendinning | 726/35 |

FOREIGN PATENT DOCUMENTS

| | | |
|---|---|---|
| JP | 2003-150360 | 5/2005 |
| JP | 2005-341156 | 12/2005 |
| JP | 2007-097023 | 4/2007 |
| WO | 2009/012281 | 1/2009 |

OTHER PUBLICATIONS http://www.kddi.com/business/pr/benri_pack/datasakujo.html
"Mobile Phone Risk Management for the Enforcement of the Personal Information Protection Law in April!", KDDI Mobile Solution, webpage printed Jul. 2, 2009.

Japanese Notification of Reason for Refusal dated Jan. 8, 2013, issued in corresponding Japanese Patent Application No. 2009-058439.

* cited by examiner

FIG. 2

| STATE | DELETION |
|---|---|
| S3 | 0 |
| S4 | 1 |
| S5 | 1 |
| REBOOT | 0 |

FIG. 3

| SUBSCRIBER ID |
|---|
| ID#1 |
| ID#2 |
| ... |
| ID#n |

FIG. 9

| SUBSCRIBER ID | THEFT FLAG |
|---|---|
| ID#1 | 1 |
| ID#2 | 0 |
| ... | |
| ID#n | 0 |

INFORMATION PROCESSING DEVICE, CONTENT PROCESSING SYSTEM, AND COMPUTER READABLE MEDIUM HAVING CONTENT PROCESSING PROGRAM

CROSS-REFERENCE TO RELATED APPLICATIONS

This application is based upon and claims the benefit of priority of the prior Japanese Patent Application No. 2009-58439, filed on Mar. 11, 2009, the entire contents of which are incorporated herein by reference.

BACKGROUND

1. Field

Embodiments described herein relate to information processing devices and method thereof, and more particularly, to processing which decrypt encrypted content using keys, key storage management devices which store and manage keys and provide keys upon requests made by information processing devices, and content processing systems having content processing devices and key storage management devices. An embodiment relates to a content processing program which is executed by a computer and causes the computer to operate as content processing devices.

2. Description of the Related Art

Services for deleting data in lost mobile phones have been developed in order to reduce the risk of unauthorized use by third parties and the risk of leakage of stored personal and company data. Such a service is described in the web page <http://www.kddi.com/business/pr/benri_pack/datasaku-jo.html>.

In this service, an address book, a mail box, data in application programs, data in an internal memory or in a memory connected to an expansion slot, and the like are to be deleted.

Examples of other techniques of deleting data and keys are discussed in the following documents.

Japanese Unexamined Patent Application Publication No. 2007-97023 discusses a technique in which various deletion conditions are set in a mobile terminal capable of wireless communication, and when the set conditions are satisfied, data is deleted under the control of the mobile terminal.

Japanese Unexamined Patent Application Publication No. 2005-341156 discusses a technique in which an encrypted content key is deleted when encrypted content is deleted.

Japanese Unexamined Patent Application Publication No. 2000-183867 discusses a technique for preventing leakage of an encryption key stored in a device in the event of theft which is used in a highly secured system using cryptography for preventing tampering. Japanese Unexamined Patent Application Publication No. 2000-183867 also discusses a technique in which a cryptographic key is stored in a volatile storage unit in a cryptographic processing device having a possibility of being stolen, and the cryptographic key is deleted when the device is turned off due to theft.

Japanese Unexamined Patent Application Publication No. 2004-355268 discusses a technique in which a plurality of split information pieces corresponding to split components of an encryption key or a decryption key are stored in different storage areas. In this technique, the encryption key or the decryption key may be deleted when operation of an information processing device is stopped due to power being cut-off and when the device becomes incapable of information processing. The encryption key or the decryption key may also be deleted when encryption or decryption of information is completed.

SUMMARY

According to an aspect of the invention, an information processing device includes a content storage unit store encrypted content, a key storage unit store a key for decrypting the encrypted content stored in the content storage unit, a content processing unit decrypt the encrypted content stored in the content storage unit using the key stored in the key storage unit, a table storage unit store a deletion table storing information indicating whether or not the key stored in the key storage unit is to be deleted when a transition from an operating state to one of other states is made, the information corresponding to the other states, and a key deletion unit configured to, when the transition from the operating state to one of the other states is made, check the information in the deletion table corresponding to the one of the other states and delete the key when the information indicates that the key is to be deleted.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 2 illustrates an example of a table stored in a non-volatile storage unit;

FIG. 3 illustrates an example of an identification (ID) table;

FIG. 9 illustrates an example of a theft flag table; and

DETAILED DESCRIPTION

Figure 1:
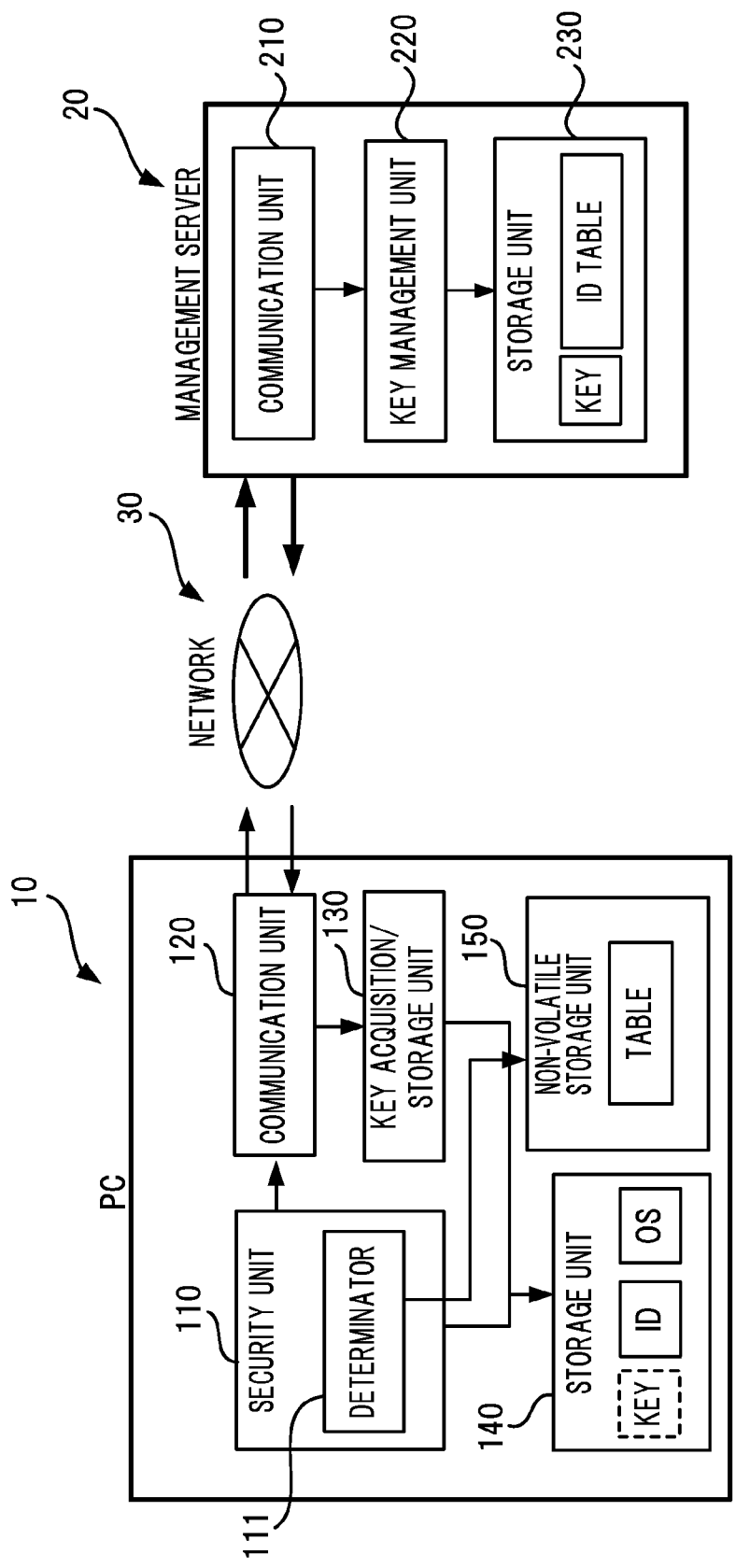
FIG. 1 is a block diagram illustrating a server-client system.

Reference will now be made in detail to the embodiments, examples of which are illustrated in the accompanying drawings, wherein like reference numerals refer to the like elements throughout. The embodiments are described below to explain the present invention by referring to the figures.

Besides mobile phones theft, there has been an increasing number of cases of theft or loss of personal computers (hereinafter referred to as PCs) and information leakage. Thus, the need for maintenance services such as locking and deletion of sensitive information has increased. PCs herein include laptop PCs, desktop PCs, and PCs having a very small size and a very light weight called UMPCs (ultra mobile PCs). PCs also include thin client PCs, built-in devices, including other easily portable devices, and the like.

For PCs having communication modules for accessing mobile phone networks, security services which have been implemented on mobile phones may be employed.

However, in the case of theft of loss of such a PC, it is not possible to execute remote security operations if the PC is located outside the communication range. Thus, an encryption key or a decryption key and data remain in the PC, which allows a malicious party to analyze the data.

To prevent such misuse of information, a technique in which a key is obtained from a server as in the case of content keys may be applied to PCs, and a system in which a key is received upon turning on a PC and is deleted upon turning off the PC may be employed. The key may be deleted upon turning off the PC or after a given time period has elapsed from termination of operation. It is also possible to combine such timings.

However, in the system allowing a key to be distributed from the server upon turning on the PC and be deleted upon turning off the PC, key deletion is performed every time the PC is turned off while being normally used, that is, in the case that the PC has not been stolen. In such a system, establishment of communication and reception of the key are performed every time the PC is turned on. If a number of PCs access the server to receive keys at the same time as the work start time, for example, the traffic to the server is increased. This may result in inefficient operation due to additional starting time for waiting for server response.

An embodiment provides an arrangement which prevents load concentration on a server and an increase in start-up time, which are likely to occur due to increased security against theft. This arrangement realizes high compatibility between prevention of an undesirable increase in start-up time and security in the event of theft.

A content processing device according to an embodiment includes a content storage unit, a key storage unit, a content processing unit, a table storage unit, a key deletion unit, and a key acquisition unit.

The content storage unit stores encrypted content.

The key storage unit stores a key for decrypting the encrypted content stored in the content storage unit.

The content processing unit decrypts the encrypted content stored in the content storage unit using the key stored in the key storage unit and processes the decrypted content.

The table storage unit stores a table storing information corresponding to the other states which indicates whether or not the key stored in the key storage unit is to be deleted when transition from an operating state to one of other states is made.

The key deletion unit, when transition from the operating state to one of the other states is made, checks the information in table corresponding to the one of the other state and deletes the key when the information indicates that the key is to be deleted.

The key acquisition unit acquires a key when no key is stored when transition from one of the other states to the operating state is made.

According to an embodiment, a key is not deleted every time transition from the operating state to another state is made. Instead, the key may be deleted or not deleted depending on the information in the table corresponding to the other state to which transitions from the operating state is being made. This prevents a significant increase in traffic due to key requests and responses and enhances security against theft since the key is deleted only when the state transition to a given state is made.

FIG. 1 is a block diagram illustrating a server-client system in a content processing system.

In FIG. 1, a PC 10 and a management server 20 are connected via a network 30. The PC 10 and the management server 20 are examples of a content processing device and a key storage management device, respectively.

The PC 10 includes hardware and a content processing program executed in the PC 10. The hardware and the content processing program function as a security unit 110, a communication unit 120, a key acquisition/storage unit 130, a storage unit 140, and a non-volatile storage unit 150.

The storage unit 140 stores data including such a key and an ID for identifying the PC 10, and an OS (operating system). The storage unit 140 also stores various application programs including the content processing program. The ID of the PC 10 is registered in advance in the management server 20.

Figure 2:
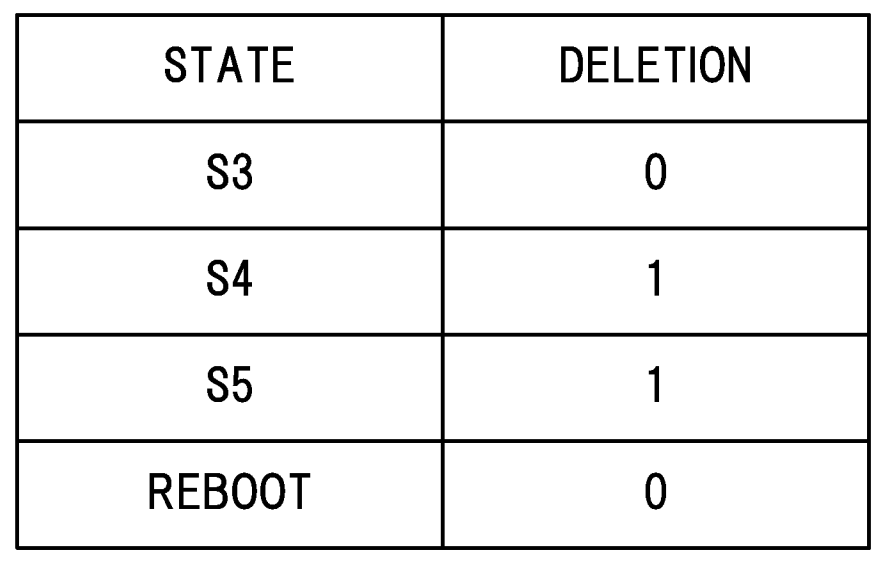

The non-volatile storage unit 150 stores a table illustrated in FIG. 2.

FIG. 2 illustrates an example of a table stored in the non-volatile storage unit 150.

This table stores states of the PC 10 and corresponding flags indicative of whether or not the key is to be deleted.

For example, "S3" represents a standby state. "S4" represents a hibernation state. "S5" represents a power-off state. "Reboot" represents a reboot state.

In addition to the above states, the PC 10 may be in an operating state (S0), a boot state (Boot), and a resume state (Resume). The operating state S0 indicates a normal operating state in which the OS has been activated. In other words, a normal operating state is a state in which an application program (e.g., content processing program) may be executed. In the "Boot" state, the PC 10 is transitioning from the power-off state S5 or the "Reboot" state to the operating state S0. In the "Resume" state, the PC 10 is transitioning from the standby state S3 or the hibernation state S4 to the operating state S0.

The table in FIG. 2 also stores flags indicating whether the key in the storage unit 140 is to be deleted ("1") or not ("0") when the PC 10 is entering from the operating state S0 to the standby state S3, the hibernation state S4, the power-off state S5, or the "Reboot" state, so as to correspond to these states. These flags are arbitrary updated by the user of the PC 10. The user may be a security manager of a company. For example, it is possible that the security manager registers tables set on the basis of the purposes or status of use of individual PCs in a server that manages the security policies, and each PC sets a table by obtaining the security policy. The table in FIG. 2 is set so that the key is not to be deleted in the standby state S3 and the "Reboot" state. For example, for a PC which is set to enter the hibernation state S4 using a timer, it is not necessary to delete the key each time the PC enters the standby state S3. This is because such a PC, even if stolen while being in the standby state S3, is likely to enter the hibernation state S4 by the timer, and the key is deleted during the state transition and thus security is ensured. In addition, the setting of the table in FIG. 2 assures convenience for a user using a PC with frequent state transitions, such as a laptop PC which is set to enter the standby state S3 when the display panel is closed. Further, the setting in which the key is not deleted in the "Reboot" state mitigates load concentration on the server that manages keys, during the time of delivery of update programs relating to security. In this way, versatility may be given to settings relating to key management.

The security unit 110 serves to maintain security of keys. For example, the security unit 110 has a determinator 111 configured to check the table in the non-volatile storage unit 150 when the PC 10 is stopped (in transition of the state S0 to the state S3, S4, S5, or "Reboot") to determine whether or not the key is deleted. If the flag is set to "1", the security unit 110 deletes the key. If the flag is set to "0", the state transition (from S0 to S3, S4, S5, or "Reboot") is completed.

The security unit 110 also checks whether a key is stored in the storage unit 140 when the PC 10 is started (transition from S3, S4, S5, or "Reboot" to S0). If no key is stored in the storage unit 140, the security unit 110 instructs the communication unit 120 to acquire a key.

Upon receiving the instruction from the security unit 110, the communication unit 120 establishes communication with the management server 20 and requests the management server 20 for a key. The communication unit 120 receives the key transmitted from the management server 20 and transfers the key to the key acquisition/storage unit 130. The key acquisition/storage unit 130 stores the key received from the communication unit 120 in the storage unit 140.

If a key is stored in the storage unit 140 when the PC 10 is started (transition from S3, S4, S5, or "Reboot" to "S0"), the PC 10 immediately activates the OS. If no key is stored in the storage unit 140, the PC activates the OS after receiving a key from the management server 20 in the manner described above and storing the received key in the storage unit 140. When content (e.g., application program) to be decrypted is started, the PC 10 decrypts the content using the key and executes the content.

The communication unit 120 complies with communication systems such as a LAN (local area network), a wireless LAN, and a wireless WAN (3G (3rd generation wide area network), WiMAX (World Interoperability for Microwave Access), PHS (personal handyphone system)). The communication unit 120 performs secure connection to the management server 20 over a VPN (virtual private network), for example, after connection to the access point of a wireless LAN or a mobile phone network is completed.

The storage unit 140 may be composed of an HDD (hard disk drive) or an SSD (solid state drive), which may be encrypted in its entirety in a hardware manner. The storage unit 140 stores a key in a circuit outside the storage area. Alternatively, the storage unit 140 may be composed of a combination of software which encrypts the entire drive based on a software and a general HDD or SSD which does not have an encryption function. In this case, the storage unit 140 stores a key in a storage area in the drive.

The management server 20 illustrated in FIG. 1 has hardware of a computer and a key management program to be executed. The operation(s) of the management server 20 may be implemented via a computer. The server may have hardware and the key management program that functions as a communication unit 210, a key management unit 220, and a storage unit 230.

The communication unit 210 communicates with the PC 10 via the network 30. The key management unit 220, in response to a request made by the PC 10 for a key, sends a key stored in the storage unit 230 to the PC 10 if the PC 10 subscribes to the system. The storage unit 230 stores keys and an ID table in which the IDs of PCs that subscribe to the system are registered.

Figure 3:
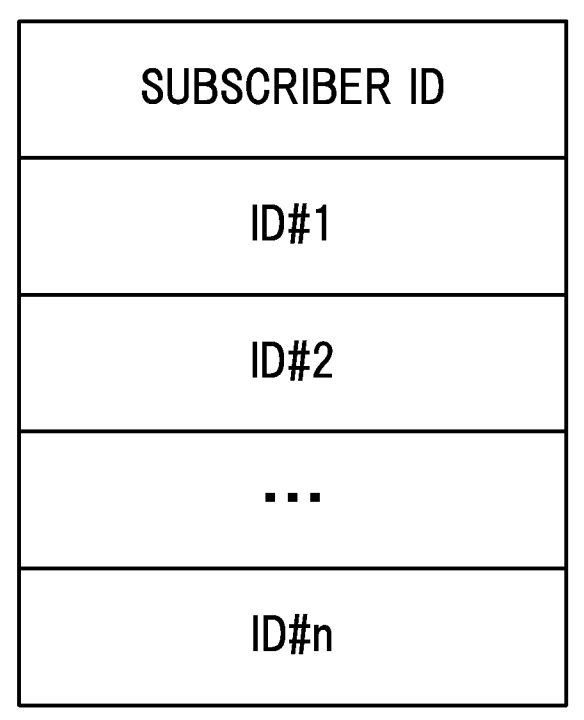

FIG. 3 illustrates an example of an ID table.

In the ID table, IDs of a plurality of PCs that subscribe to the system are registered.

When the communication unit 210 of the management server 20 receives a key request from the PC 10, the key management unit 220 checks the ID table in the storage unit 230 and determines if the ID of the PC 10, i.e., the sender of the key request, is registered in the ID table. If the ID of the PC 10 is registered in the ID table, the key management unit 220 retrieves a key from the storage unit 230 and sends the key to the communication unit 210. The communication unit 210 transmits the key received from the key management unit 220 to the PC 10.

Figure 4:
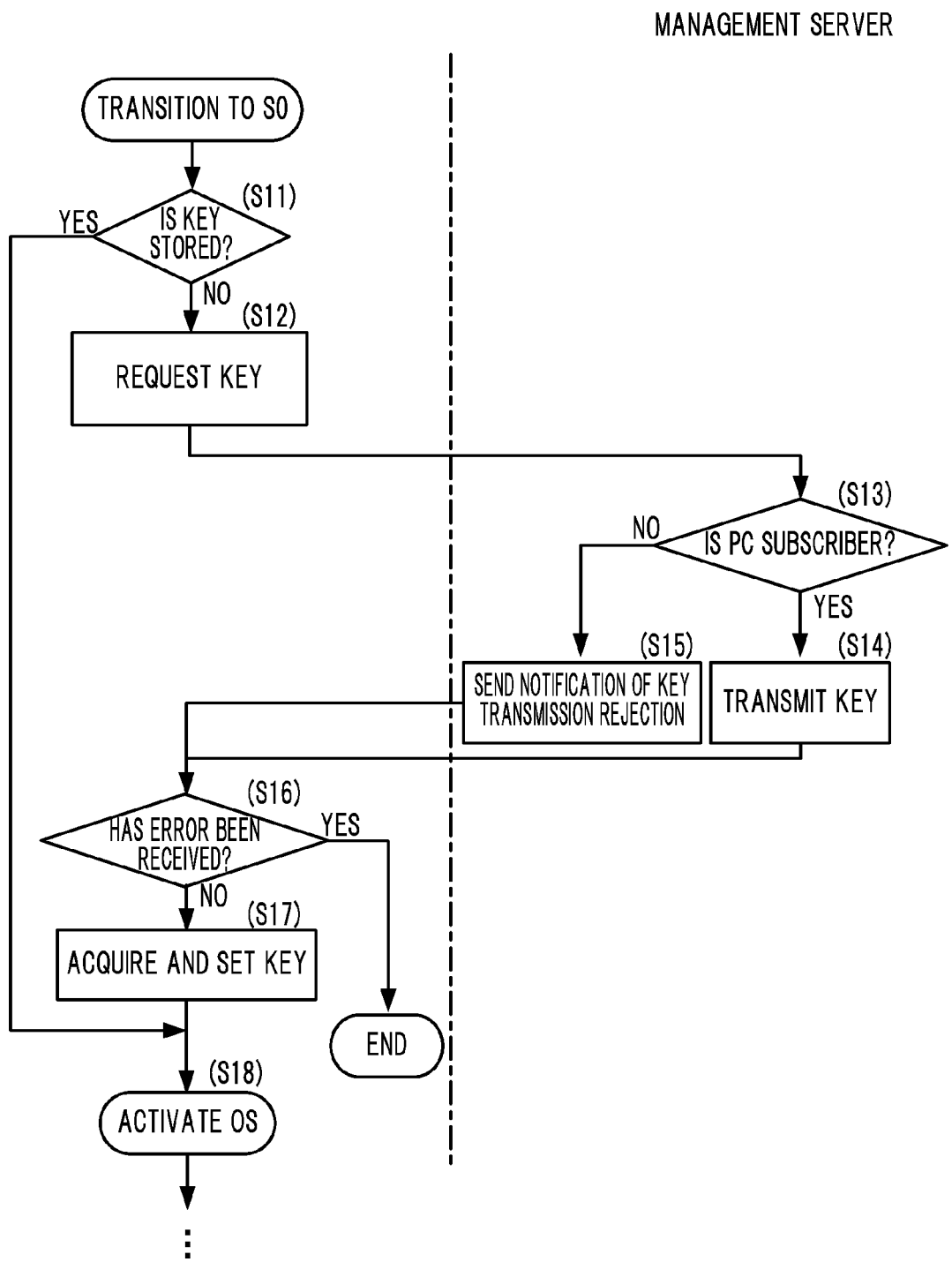
FIG. 4 is a flowchart illustrating an operation procedure to be performed when a personal computer (PC) is booting or resuming.

FIG. 4 is a flowchart illustrating an operation procedure which is to be executed while the PC 10 is in the "Boot" state (transition from S5 or "Reboot" to S0) and in the "Resume" state (transition from S3 or S4 to "S0").

Firstly, the determinator 111 of the PC 10 searches in the storage unit 140 to determine if a key is stored in the storage unit 140 (Operation S11). When it is determined that no key is stored in the storage unit 140, the communication unit 120 communicates with the management server 20 and requests a key using the ID of the PC 10 (Operation S12).

When the communication unit 210 of the management server 20 receives the key request from the PC 10, the key management unit 220 checks the ID table in the storage unit 230. The key management unit 220 determines whether or not the PC 10 subscribes to the system (Operation S13). If it is determined that the PC 10 subscribes to the system, the key management unit 220 retrieves and encrypts a key in the storage unit 230 and sends the key to the communication unit 210. The communication unit 210 transmits the encrypted key to the PC 10 (Operation S14).

On the other hand, if it is determined that the PC 10 does not subscribe to the system, the key management unit 220 notifies the communication unit 210 of the determination result. The communication unit 210 sends the PC 10 an error indicating rejection of key transmission (Operation S15).

The PC 10 terminates the operation procedure upon receiving the error (Operation S16). On the other hand, when the PC 10 receives an encryption key, the PC 10 decrypts the key and stores the decrypted key in the storage unit 140 (acquire and set key in at Operation S17). Then, the PC activates the OS (Operation S18) and further performs operations such as activation of an application program and decryption of encrypted content using the key.

When it is determined in Operation S11 that no key is stored in the storage unit 140, the PC immediately activates the OS (Operation S18), and performs subsequent processing without requesting a key.

Figure 5:
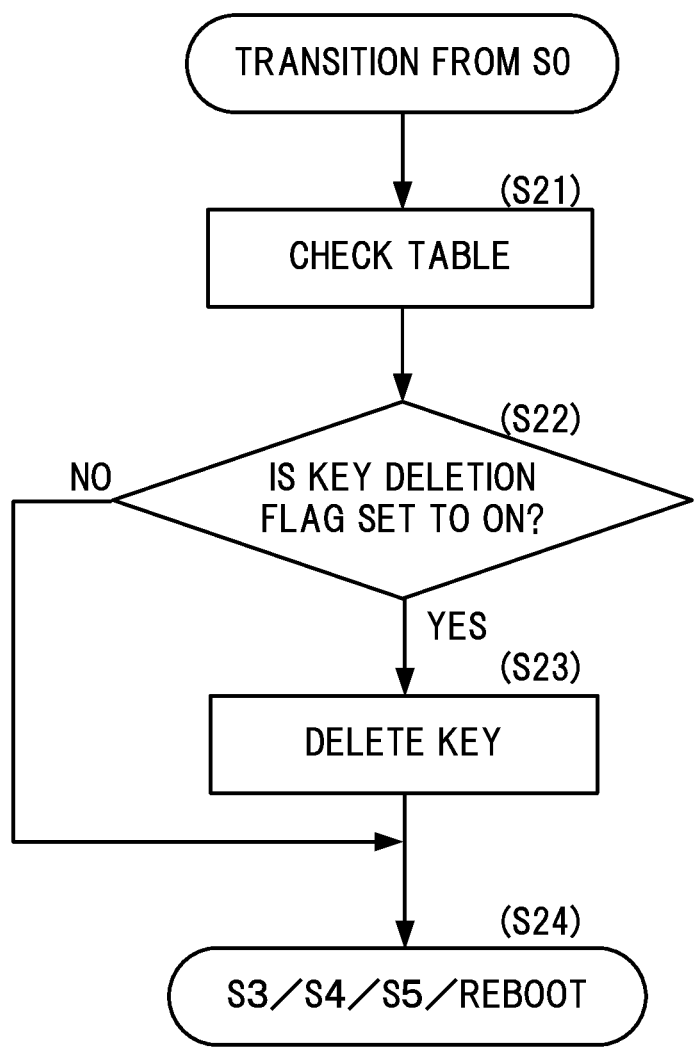
FIG. 5 is a flowchart illustrating an operation procedure to be performed when transition from an operating state to another state is made.

FIG. 5 is a flowchart illustrating an operation procedure performed when the PC 10 transitions from the operating state S0 to another state.

In this procedure, the security unit 110 checks the flags in the table in the non-volatile storage unit 150 illustrated in FIG. 2 to determine a key deletion flag corresponding to a state to which the PC 10 is transitioning (S3, S4, S5, or "Reboot") is set to "0" or "1" (Operation S21). At operation 22, a procedure is implemented to determine whether key deletion flag is set to on. If the key deletion flag is set to "1", the security unit 110 deletes the key in the storage unit 140 (Operation S23), and performs processing necessary for transition to the destination state (Operation S24). On the other hand, if the key deletion flag is set to "0", the key in the storage unit 140 is not deleted, and processing necessary for transition to the destination state is performed (Operation S24).

In the following, an embodiment is described below in detail.

Figure 6:
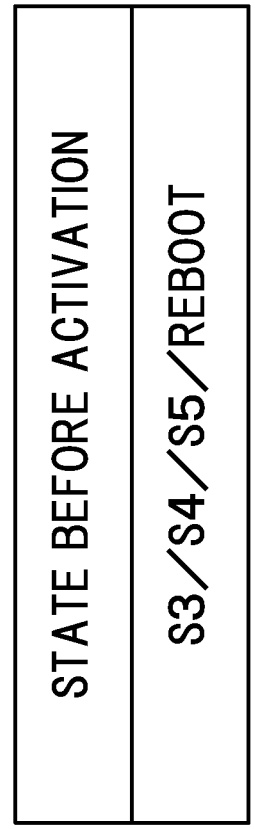
FIG. 6 illustrates another table stored in a storage unit of a PC.

In this embodiment, a table illustrated in FIG. 6 is stored in the non-volatile storage unit 150 illustrated in FIG. 1, in addition to the table illustrated in FIG. 2.

FIG. 6 illustrates a table stored in the non-volatile storage unit 150 of the PC 10.

The table stores a state of the PC 10 before start up (S3, S4, S5, or "Reboot"), (state before transition to S0 i.e., previous destination state to which the PC 10 has transitioned from S0).

Figure 7:
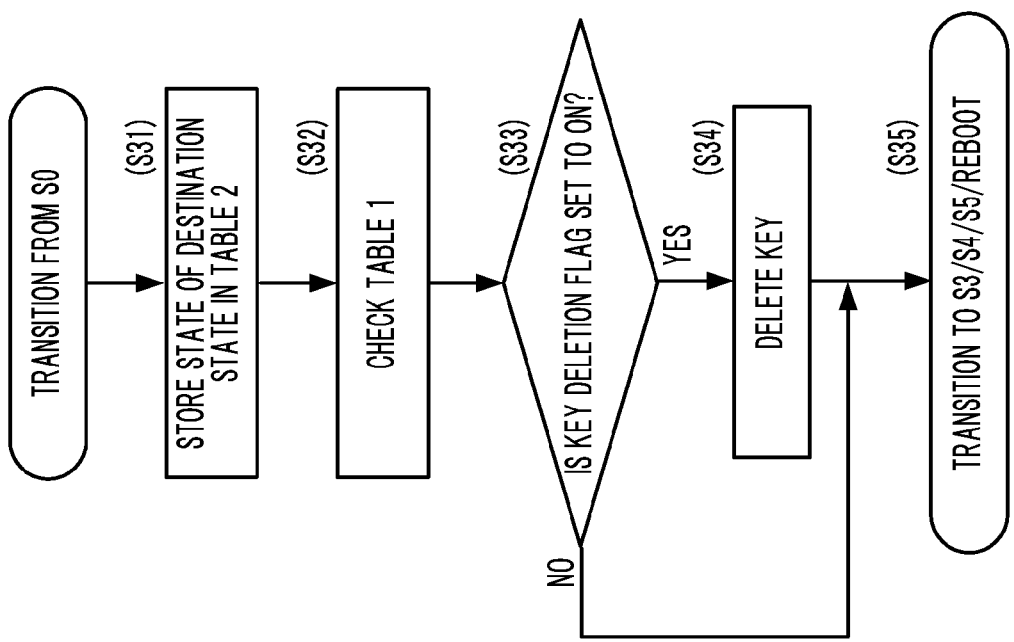
FIG. 7 is a flowchart illustrating an operation procedure to be performed when transition from an operating state to another state is made.

FIG. 7 is a flowchart illustrating an operation procedure performed when the PC 10 transitions from the operating state S0 to another state (S3, S4, S5, or "Reboot") according to an embodiment. FIG. 7 is a flowchart illustrating an alternative to the flowchart in FIG. 5.

In an embodiment, the non-volatile storage unit 150 of the PC 10 in FIG. 1 stores both the table illustrated in FIG. 2 (hereinafter referred to as Table 1) and the table illustrated in FIG. 6 (hereinafter referred to as Table 2).

When the PC 10 transitions from the operation state S0 to another state, the transition destination state (S3, S4, S5, or "Reboot") is stored in Table 2 (FIG. 6) (Operation S31). The following operations (S32 to S35) are similar to the operations (S21 to S24) in the flowchart in FIG. 5, and thus the description thereof will be omitted.

Referring again to FIG. 4, an operation procedure performed when the PC 10 transitions from the transition destination state (S3, S4, S5, or "Reboot") to the operating state S0 in this embodiment is described.

In the embodiment described above, determination of Operation S11 of the presence or absence of a key is performed on the basis of determination as to whether or not a key is stored in the storage unit 140. On the other hand, in this embodiment, Table 2 (FIG. 6) is checked in Operation S11 to determine from which state (S3, S4, S5, or "Reboot") the PC 10 is transitioning to the operating state S0. Then, Table 1 (FIG. 2) is checked to determine whether the key deletion flag corresponding to the previous state (S3, S4, S5, or "Reboot") is set to "1" or "0". If the key destination flag corresponding to the previous state is set to "1", the operation procedure proceeds to Operation S12. If the key destination flag is set to "0", the operation procedure proceeds to Operation S18.

In this embodiment, operations other than Operation S11 which are performed in transition to the operating state S0 are similar to Operations S12 to S18 in the embodiments described above, and the description thereof will be omitted.

In this embodiment, when the PC 10 transitions from the operation state S0 to another state, Table 2 (FIG. 6) is prepared and the transition destination state is written to Table 2. When the PC 10 again transitions to the operating state S0, the previous state is determined by checking Table 2. In this way, determination as to whether or not a key is stored in the storage unit 140 may be performed by determining whether or not the key deletion flag in Table 1 corresponding to the previous state is set to "1".

In the following, further another embodiment is described.

Figure 8:
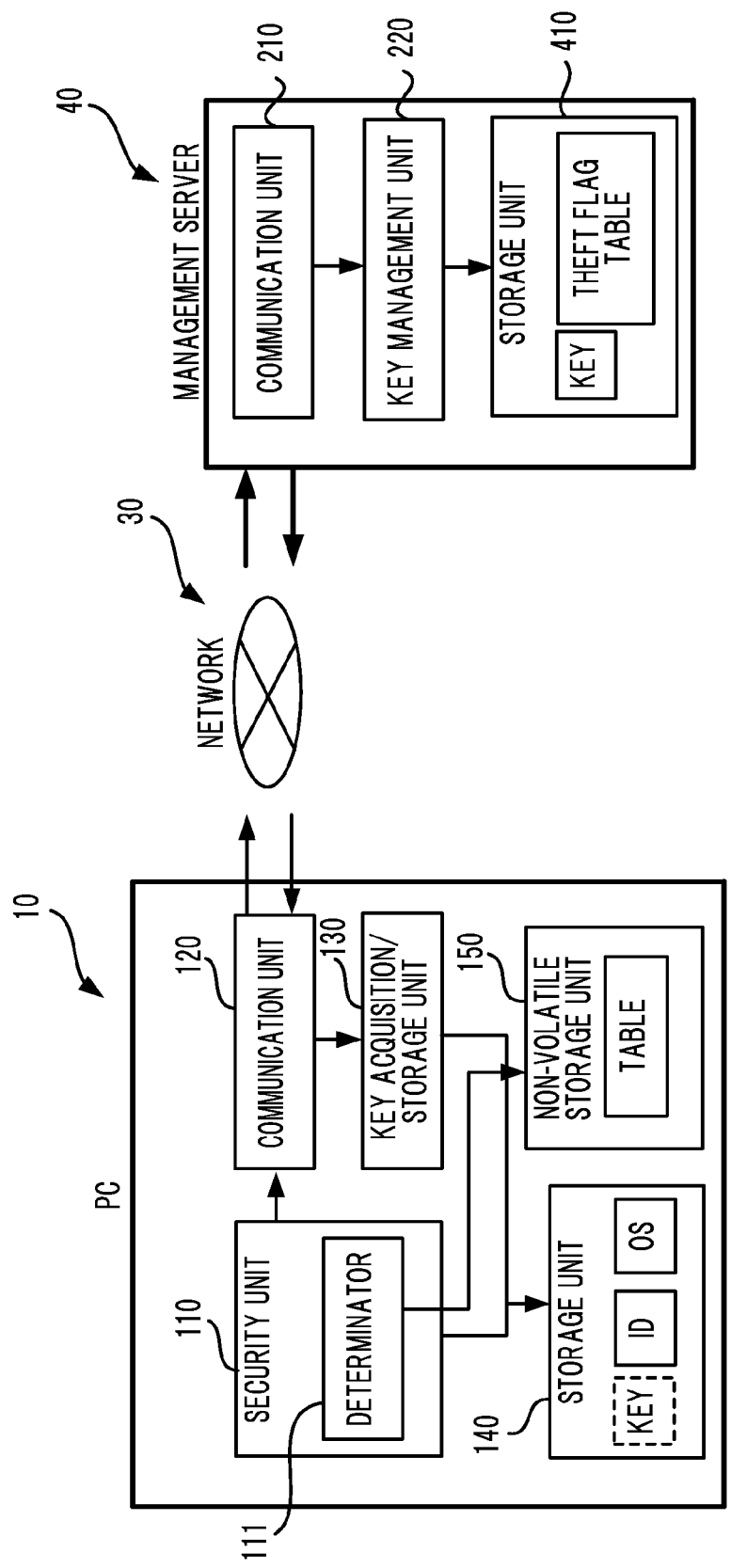
FIG. 8 is a block diagram illustrating a server-client system.

FIG. 8 is a block diagram illustrating a server-client system according to further an embodiment.

The difference between the systems in FIG. 1 and FIG. 8 is present in a management server 40. The management server 20 in FIG. 1 stores the storage unit 230 storing keys and an ID table. On the other hand, the management server 40 in this embodiment has a storage unit 410 storing keys and a theft flag table. The other components in the system illustrated in FIG. 8 are similar to those illustrated in FIG. 1, and are referred to using the same reference numerals as those used in FIG. 1.

Figure 9:
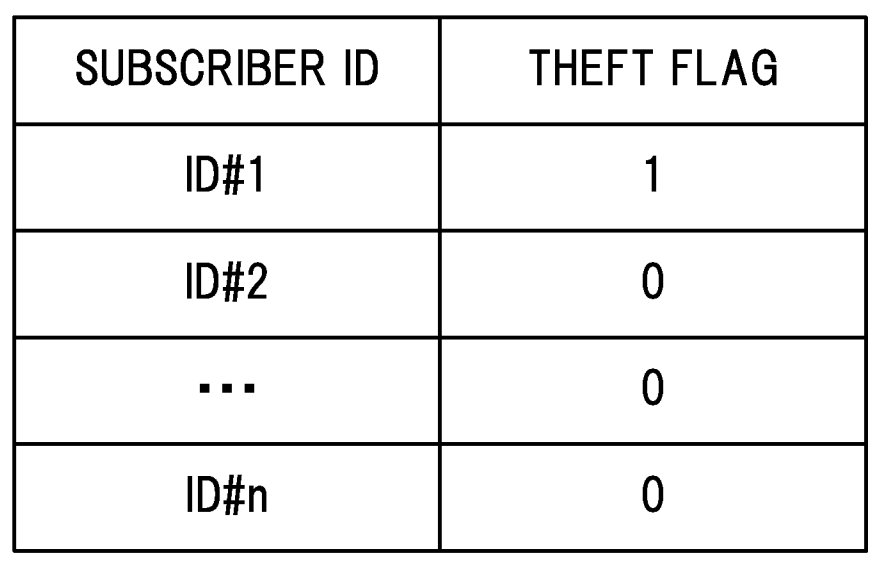

FIG. 9 illustrates an example of a theft flag table.

In this theft flag table, a list of IDs of PCs that subscribe to the system (subscriber IDs) and theft flags corresponding to the subscriber IDs ("1" or "0") are registered. When a notification of theft or loss is sent from the user of a subscriber PC to the management server 40 or the manager of the management server, the theft flag corresponding to the ID of the subscriber PC is set to ON ("1"). In the example of FIG. 9, the theft flag corresponding to a subscriber ID #1 is set to "1". This theft flag table servers as an ID table storing the list of the IDs of subscriber PCs as in the above embodiments and further servers to indicate whether or not each of the subscriber PCs is stolen or lost.

Figure 10:
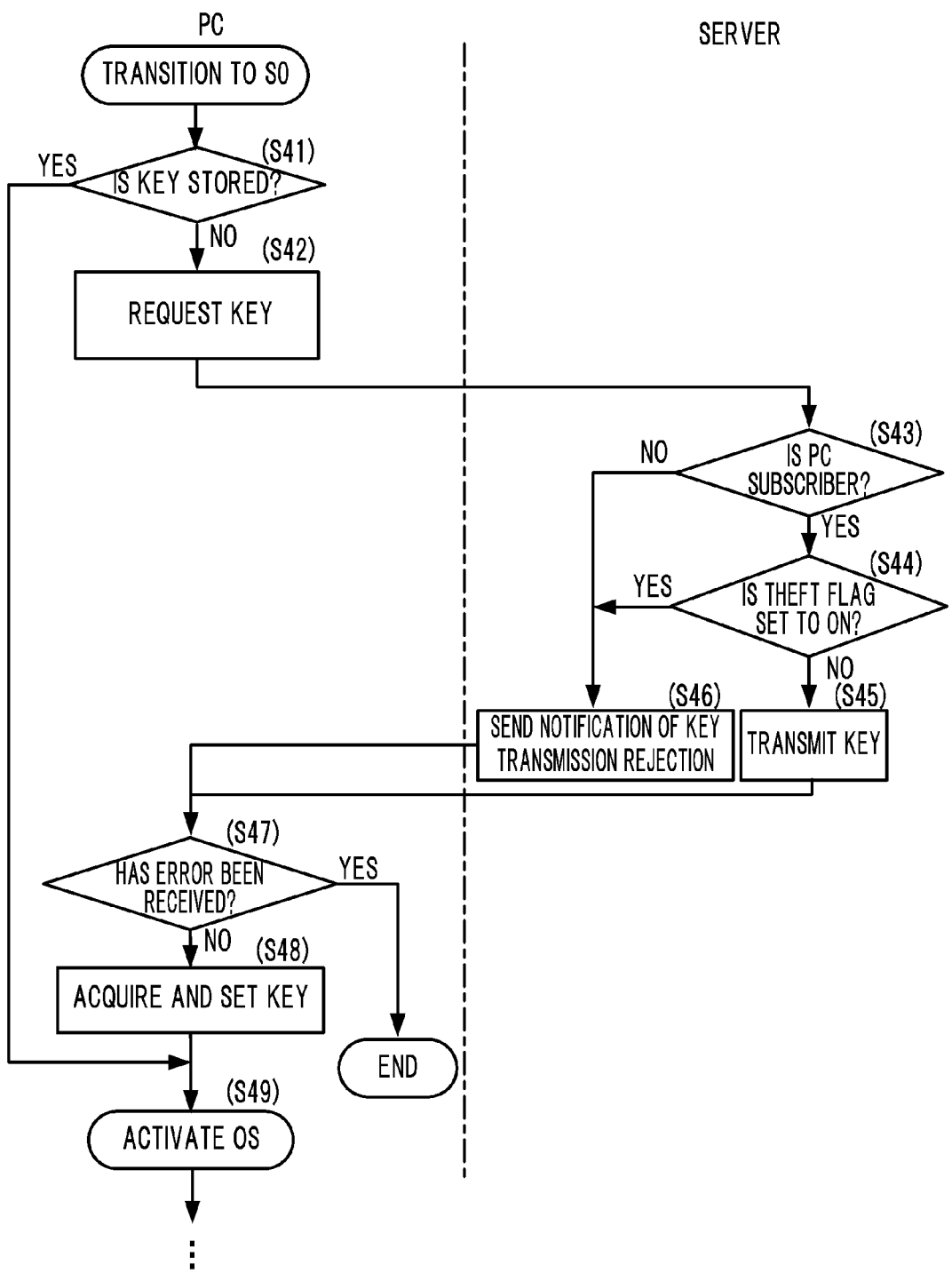
FIG. 10 is a flowchart illustrating an operation procedure to be performed when transition from a state to an operating state is made.

FIG. 10 is a flowchart illustrating an operation procedure performed when the PC 10 transitions from a state (S3, S4, S5, or "Reboot") to the operating state S0 according to an embodiment.

Operations other than Operation S44 (Operations S41 to S43 and Operations S45 to S49) in the flowchart in FIG. 10 are similar to Operations S11 to S18 illustrated in FIG. 4, respectively. Thus, operations different from those illustrated in FIG. 4 are described.

In Operation S43, the theft flag table is checked, and it is determined whether or not the PC requesting a key is a subscriber PC. If the PC is a subscriber PC, it is determined whether the theft flag corresponding to the ID of the subscriber PC is set to "1" or "0". When the theft flag is set to "0", the operation procedure proceeds to Operation S45, and a key is encrypted and transmitted to the PC.

When it is determined that the PC requesting a key is not a subscriber PC or, if it is a subscriber PC, the theft flag corresponding to the PC is set to ON, the operation procedure proceeds to Operation S46, and an error indicating rejection of key transmission is transmitted.

According to an embodiment, a computer-implemented method is provided including determining an operating state of a device and deleting a key for decrypting content in association with the device when the determining indicates that the device is transitioning from a first predetermined state to a second predetermined state.

According to this embodiment, security in the event of theft or loss is further enhanced.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention, the scope of which is defined in the claims and their equivalents.

What is claimed is:

1. An information processing device, comprising:
    a content storage configured to store encrypted content;
    a key storage configured to store a key configured to decrypt the encrypted content stored in the content storage unit;
    a table storage configured to store a deletion table having information indicating whether the key stored in the key storage is to be deleted or to be maintained when a transition from an operating state of the information processing device to one of other states is made, where the information corresponds with the other states; and
    a processor configured to:
        decrypt the encrypted content stored in the content storage using the key stored in the key storage;
        check, when the transition from the operating state to one of the other states is made, the information in the deletion table,
        delete, during the transition, the key when the information in the deletion table indicates that the key is to be deleted, and maintain the key when the information indicates that the key is to be maintained; and
        acquire the key when the key is not stored in the key storage when the transition from the one of the other states to the operating state is made, and
    wherein power consumption of the information processing device in the one of other states is less than power consumption of the information processing device in the operating state.

2. The information processing device of claim 1, comprising:
    a communication unit configured to communicate with a key storage management device which stores and manages the key,
    wherein the key is acquired by causing the communication unit to request the key storage management device to transmit the key and receive the key transmitted from the key storage management device.

3. The information processing device of claim 1, wherein a presence or an absence of the key is determined by searching in the key storage.

4. The information processing device of claim 3, comprising:
    checking the information in the deletion table corresponding to a state from which the transition to the operating state is made and recognizing the absence of the key when the information corresponding to the state indicates that the key is to be deleted.

5. The information processing device of claim 1, wherein the deleting references a deletion key table during transition between states, and the deletion key table identifies a destination state and the deleting is implemented when the device transitions to the destination state identified in the deletion key table.

6. A content processing system in which content processing devices configured to decrypt encrypted content using keys and a key storage management device configured to store and manage the keys are connected to each other via a communication network, comprising:
    each of the content processing devices including:
        a content storage configured to store encrypted content;
        a first key storage configured to store a key for decrypting the encrypted content stored in the content storage;
        a first table storage configured to store a deletion table having information indicating whether the key stored in the first key storage is to be deleted or to be maintained when a transition from an operating state of a corresponding of content processing devices to one of other states is made, the information corresponding with the other states; and
    a processor configured to:
        decrypt the encrypted content stored in the content storage using the key stored in the first key storage and process the decrypted content;
        check, when the transition from the operating state to one of the other states is made, the information in the deletion table,
        delete, during the transition, the key when the information in the deletion table indicates that the key is to be deleted, and maintain the key when the information indicates that the key is to be maintained;
        communicate with the key storage management device; and
        acquire the key when the key is not stored in the first key storage when a transition from the one of the other states to the operating state is made, by requesting the key storage management device to transmit the key and receive the key transmitted from the key storage management device,
    the key storage management device comprising:
        a second communication configured to communicate with the content processing devices;
        a second key storage configured to store a key for decrypting the encrypted content; and
        a processor that executes a key management process to, when a key transmission request is received by the second communication, cause the second communication to transmit the key to a content processing device from which the key transmission request has been received, and
    wherein power consumption of the corresponding of content processing devices in the one of other states is less than power consumption of said one of the corresponding of content processing devices in the operating state.

7. The content processing system of claim 6, wherein the key storage management device includes a second table storage unit configured to store a key transmission table storing information regarding key transmission permission to the content processing devices, the key transmission permission information corresponding to the content processing devices and
    wherein when a key transmission request is received by the second communication, the key management checks the information in the key transmission table corresponding to a content processing device from which the transmission request has been received and, when key transmission to the content processing device is permitted, causes the second communication to transmit the key.

8. A non-transitory storage medium storing a content processing program executed in a computer capable of executing programs to cause the computer to operate as a content processing device including:

storing encrypted content;

storing a key for decrypting the encrypted content stored;

decrypting the encrypted content stored using the key;

storing a deletion table having information indicating whether the key stored is to be deleted or to be maintained when a transition from an operating state of the content processing device to one of other states is made, the information corresponding to the other states;

checking, when the transition from the operating state to one of the other states is made, the information in the deletion table, deleting the key, during the transition, when the information in the deletion table indicates that the key is to be deleted, and maintain the key when the information indicates that the key is to be maintained; and acquiring the key when the key is not stored when a transition from the one of the other states to the operating state is made, and wherein power consumption of the content processing device in the one of other states is less than power consumption of the content processing device in the operating state.

9. The non-transitory storage medium storing the content processing program of claim 8, wherein the computer has a communication unit configured to communicate with a key storage management device which stores and manages the key, and wherein the key is acquired when determining that the key is not stored when the transition from the one of the other states to the operating state is made, by causing the communication unit to request the key storage management device to transmit the key and receive the key transmitted from the key storage management device.

10. The non-transitory storage medium storing the content processing program of claim 8, comprising:

determining a presence or an absence of the key by searching in a key storage unit.

11. The non-transitory storage medium storing the content processing program of claim 8, comprising:

checking the information in the deletion table corresponding to a state from which the transition to the operating state is made and recognizing the absence of the key when the information corresponding to the state indicates that the key is to be deleted.

12. A computer-implemented method, comprising:

determining, using a processor, a transition from an operating state of a device to other one of states of the device; and deleting, during transition to a destination state of the device among the other one of states, a key configured to decrypt content in association with the device when said determining indicates the transition is made to the destination state, where the deleting of the key is implemented when determining information stored corresponding to the destination state indicates that the key is to be deleted, and the key is maintained when the information indicates that the key is to be maintained, and wherein power consumption of the device in the other one of states is less than power consumption of the device in the operating state.

* * * * *